Jan. 11, 1966    C. THUMIM ETAL    3,228,537
VARIABLE BACK GAUGE TRAVEL ADJUSTMENT MEANS FOR GUILLOTINE
TYPE CUTTING MACHINE
Filed Sept. 11, 1963    4 Sheets-Sheet 1
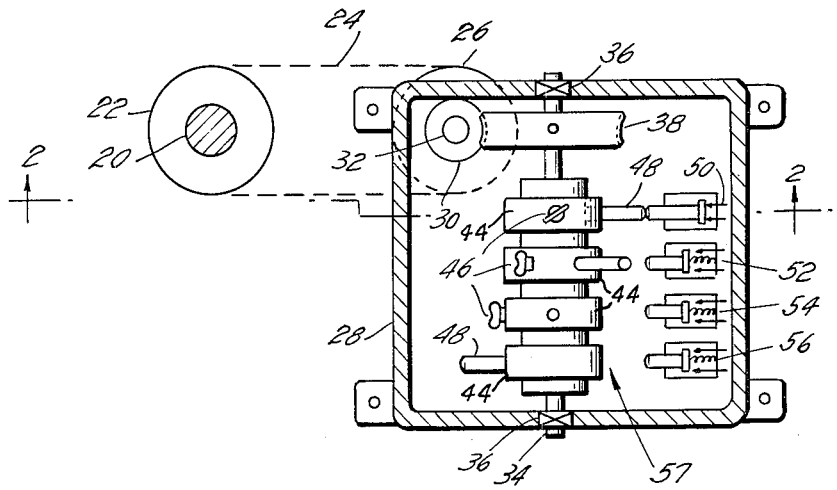
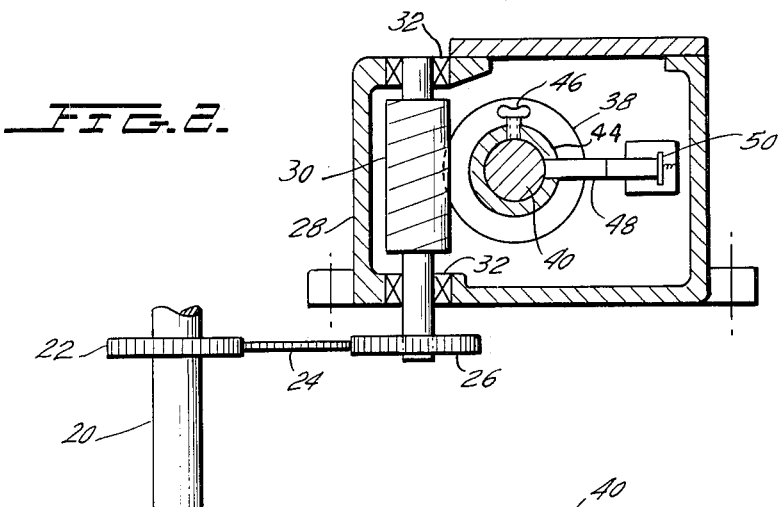
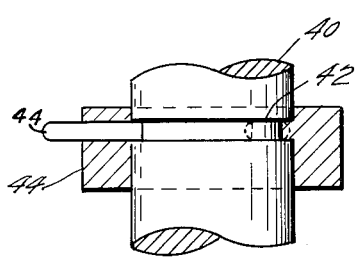
INVENTORS
CARL THUMIM
NICHOLAS HERMAN
BY
OSTROLENK, FABER, GERB & SOFFEN
ATTORNEYS

INVENTORS
CARL THUMIM
NICHOLAS HERMAN
BY

OSTROLENK, FABER, GERB & SOFFEN
ATTORNEYS

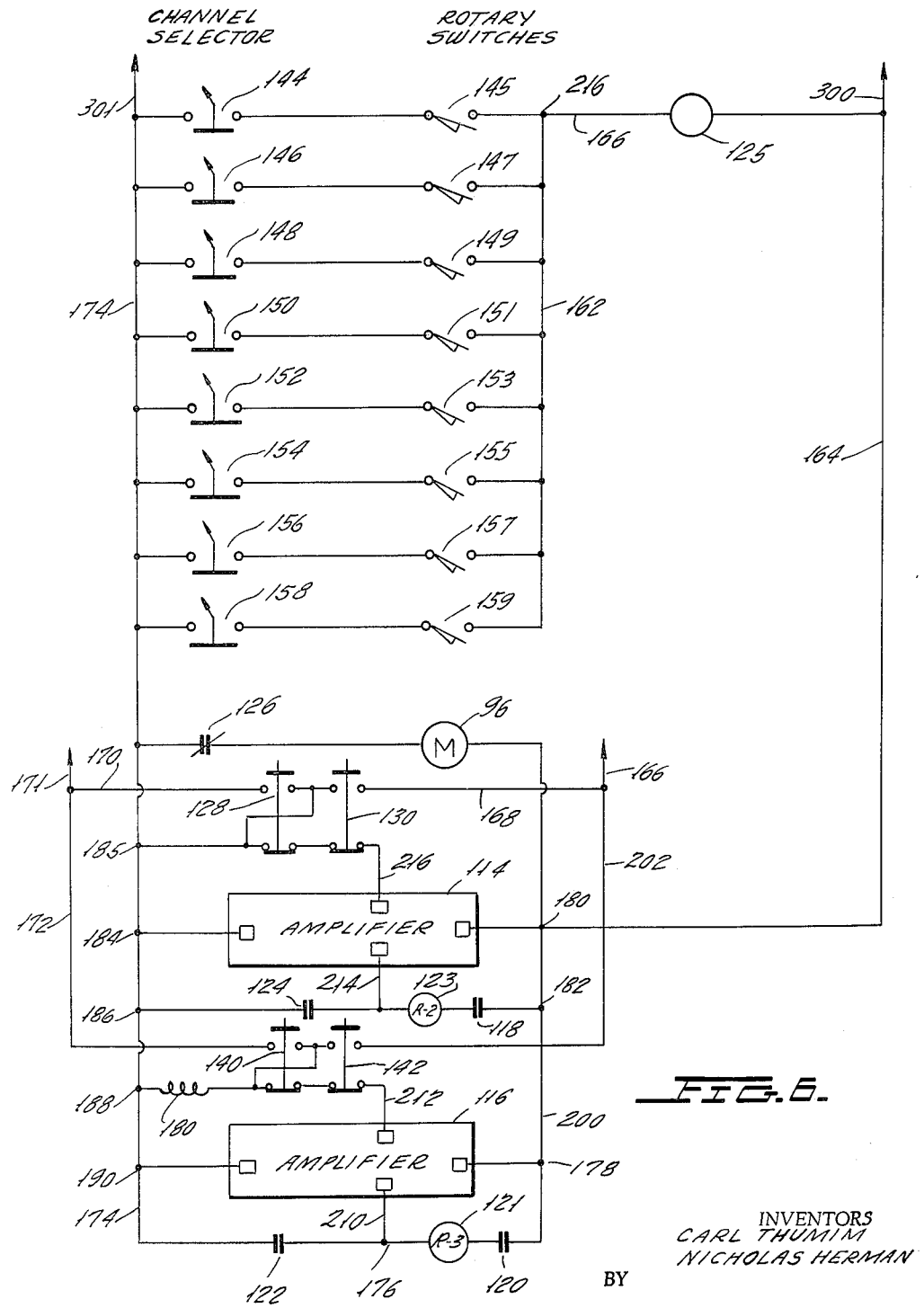

Jan. 11, 1966  C. THUMIM ETAL  3,228,537
VARIABLE BACK GAUGE TRAVEL ADJUSTMENT MEANS FOR GUILLOTINE
TYPE CUTTING MACHINE
Filed Sept. 11, 1963  4 Sheets-Sheet 4
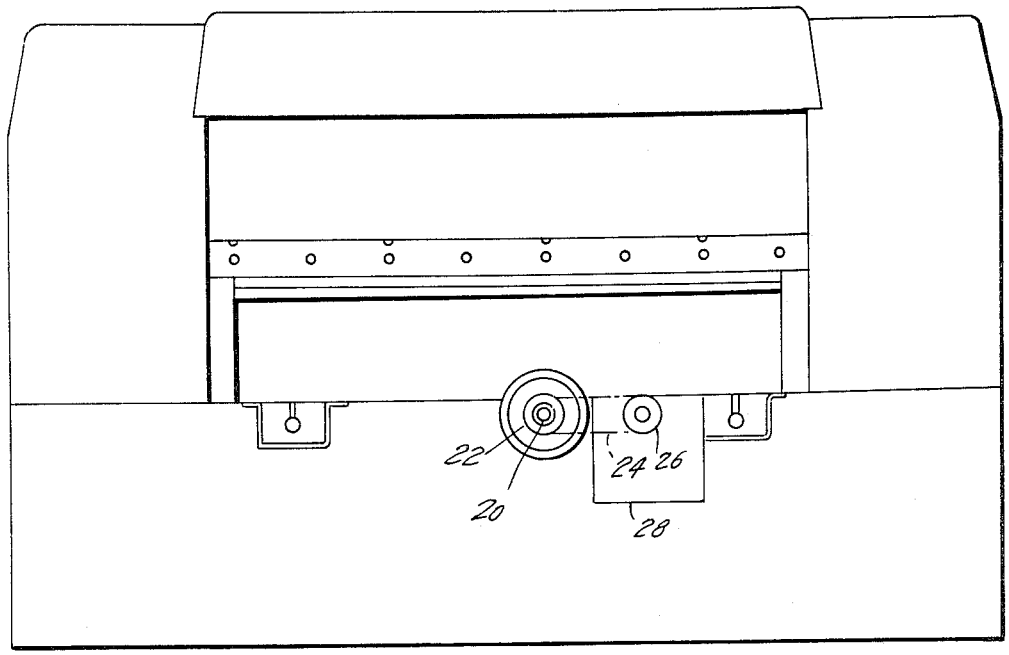
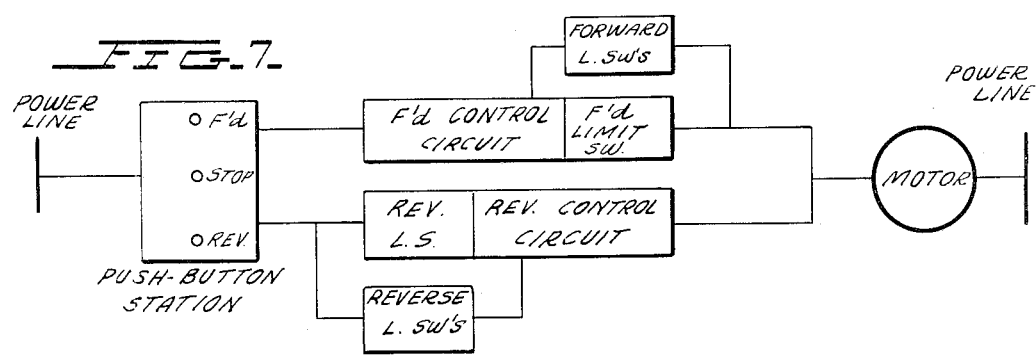
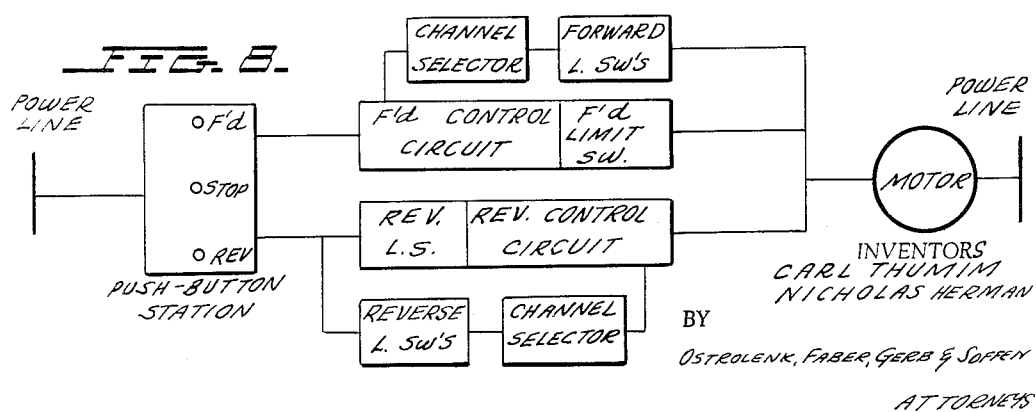
INVENTORS
CARL THUMIM
NICHOLAS HERMAN
BY
OSTROLENK, FABER, GERB & SOFFEN
ATTORNEYS United States Patent Office 3,228,537
Patented Jan. 11, 1966

3,228,537
VARIABLE BACK GAUGE TRAVEL ADJUSTMENT MEANS FOR GUILLOTINE TYPE CUTTING MACHINE
Carl Thumim, Chicago, and Nicholas Herman, Palatine, Ill., assignors to Miehle-Goss-Dexter, Incorporated, Chicago, Ill., a corporation of Delaware
Filed Sept. 11, 1963, Ser. No. 308,253
7 Claims. (Cl. 214—1.6)

This invention relates to variable back gauge travel adjustments for controlling the operation of the back gauge of the guillotine type of paper cutting machines which employ various types of control systems for programmed deceleration and stopping of the back gauge during use.

Reference is made to my copending application Serial No. 840,281 filed on September 16, 1959, now Patent No. 3,174,370, for "Magnetic Tape Control Systems for Guillotine Type Cutting Machine."

During the operation of such machines in the past the operator had to go to the rear of the machine to change the limits of travel of the back gauge to obtain various lengths of travel of the back gauge during use. For example, in order to obtain different spacing of paper cuts, the operator found it necessary to adjust the side gauge limit switch which paralleled the action or the rear limit switch together with adjustment of the rod on the back gauge to permit the back gauge to strike the front limit switch earlier or later as required for particular spaced paper cut in the machine.

The above problem was solved by adding some novel improvements to the various embodiments of the above machine in the form of new devices and applications thereof for use with each type of back gauge operation for a particular type of control system for the above machine.

New relay and switch circuitry to effect a new economical time saving and efficient operation of this type of machine as set forth in the embodiments of this invention will be apparent to those skilled in the art.

The primary object of the present invention is to provide a novel means of operational control contiguous to the front of a cutting machine for quickly and accurately adjusting the limits of travel of the back gauge.

Another object of the present invention is the arrangement of the foregoing means to operate in synchronism with other programmed control systems to obtain a desired spacing of material cuts.

Another object of the present invention is to provide a novel limit switch means of control in conjunction with the present relay circuitry and switch control system of various magnetic tape control systems for guillotine type cutting machines.

Another object of the present invention is to provide a novel variable back gauge travel adjustment means embodying magnetic tape means, cooperating circuitry arrangements and mechanical linkage means connected by linkage means to the driven lead screw of the back gauge to program and control the travel limits of the back gauge of a cutting machine.

Another object of the present invention is to provide a novel variable back gauge travel adjustment means synchronized with a magnetic control system for multiple programming of the travel of a back gauge of a cutting machine into slow and stop signal areas for a channel of operation.

These and further objects of this invention will become more apparent from the following description of exemplary embodiments thereof, illustrated in the accompanying drawings, in which:

FIGURE 1 is a plan view of one of the embodiments of the invention connected by mechanical linkage to the lead screw driving means of the back gauge;

FIGURE 2 is a sectional view in elevation of FIGURE 1 taken on lines 2—2 looking in the direction of the arrows;

FIGURE 3 is an enlarged view of the rotary drum and ring means which carries projection means to actuate a contiguous limit switch of a control means;

FIGURE 6 is an exemplary circuit diagram to implement the control means of FIGURE 4 for travel adjustments of a back gauge;

FIGURE 7 is a block diagram showing the general arrangement and control sequence of the electrical components for a guillotine paper cutting utilizing the form of the invention as illustrated in FIGURE 1;

FIGURE 8 is a block diagram similar to FIGURE 7, but illustrating the arrangement for utilizing the embodiment of the invention shown in FIGURE 4; and FIGURE 9 is a simplified elevation of a guillotine paper cutter looking toward the front of the machine and illustrating the location of the limit switch control box.

Figure 4:
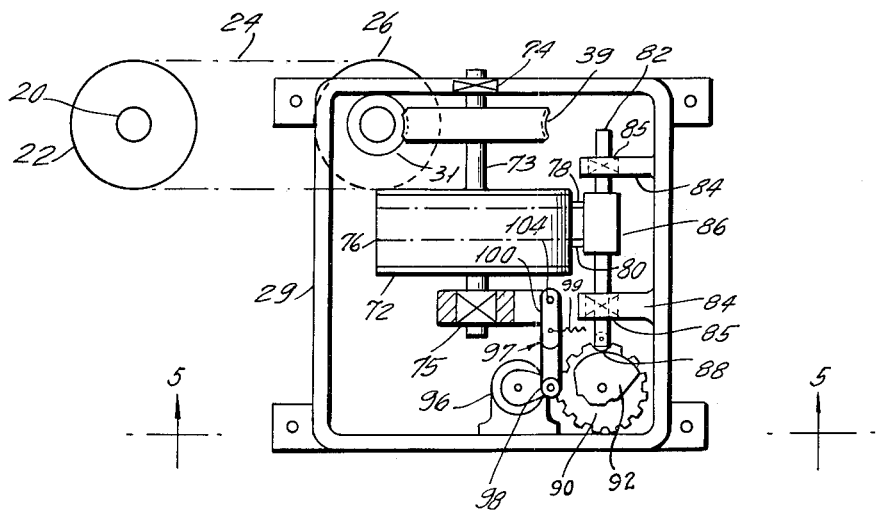
FIGURE 4 is a plan view of another embodiment of the invention showing a magnetic tape control means interconnected by pulleys and timing belt means to the lead screw drive means of a back gauge.

For the sake of clarity, the electrical connections between the various limit switches and the program panel of a control system have not been shown in FIGURES 1 and 2; it being obvious to one skilled in the art to make these connections in accordance with the control circuitry of my copending patent application Serial No. 840,281, filed September 16, 1959, now Patent No. 3,174,370 or tied in with conventional power operated back gauge control circuitry as found in commercial guillotine paper cutters having synchronized automatic control of the gauge, clamp, and knife.

FIGURES 1, 2 and 3 illustrate an exemplary embodiment of the present invention in which like reference numerals designate like parts.

Referring to FIGURES 1 and 2, the variable back gauge travel adjustment consists of limit switches 50, 52, 54 and 56 which are actuated by pin members 48 carried in ring members 44 mounted on drum 40 in groove means 42. Ring members 44 are selectively positioned as desired and secured in groove 42 by wingnut screw means 46. Drum means 40 terminates in end shaft means mounted in bearing means 36 located as shown in housing means 28. Near one end of the shaft means of drum means 40 a worm gear 38 is securely mounted thereon. Worm gear 38 is driven by worm means 30 mounted by its end shaft members in bearing members 32 in housing means 28 such that one end of worm means 30 extend externally of housing means 28 to carry sprocket means 26 which is driven by sprocket means 22 through chain or timing belt means 24. Sprocket member 22 is suitably mounted on a driven conventional back gauge lead screw member 20. Drum means 40 is therefore driven in exact synchronism with lead screw means 20. Drum means 40 carries groove means 42 and acts as a sliding retainer for pins 48 which are fastened firmly to ring means 44. Drum means 40 has three ring means 44 which can rotate but cannot move axially because of the pins 48 in the respective groove means 42. The limit switch actuator 57 consists of drum means 40, four ring members 44, each carrying pin member 48 arranged as shown to actuate limit switches 50, 52, 54 and 56 which is attached to circuitry to control the driving means of lead screw means 20. Therefore, the limit switch actuator 57 selectively limits the travel of the back gauge of the cutting machine as programmed or desired.

FIGURE 3 is a partially enlarged view of drum means 40 in association with a partial section of ring 44 containing pin means 48 with aperture and groove means 42. For motor operation of the back gauge, two of rings 44 for a channel of operation are required, one ring to limit the front motion of the back gauge and the other to limit the rear motion of the gauge. The reduction of the gearing in FIGURES 1 and 2 is such that for the entire travel of the back gauge, drum 40 makes a little less than one full revolution which is another novel feature of the device for operation.

In the operation of this embodiment of the invention the front limit switch for a specified limit of travel is connected to the conventional side limit switch as desired and in series with the standard front safety limit switch. Likewise the corresponding rear limit switch for the travel is connected to the conventional side gauge limit switch and in series with the standard rear safety limit switch of a cutting machine. Thus, the standard limit switches serve as the absolute limit of travel of the back gauge while back and front limit switches of FIGURES 1, 2 and 3 can be adjusted for a desired operational limit at the front of the machine by the operator when operated manually, in accordance with this invention by resetting each pair of rings 44 for a limit of travel or if the limits of travel for each operation of a cutting job are known, multiple pairs of rings 44 may be used to include a reasonable number of different limits or channels of travel of the back gauge for different material cuts, which control may be incorporated in the form of a small packaged control means at the front of the machine. As member 40 makes less than one revolution for a complete travel of the back gauge, the limit switches can be adjusted so that the unused switch actuators 48 are in the area of rotation of actuator 57 which never contact the limit switches of the channels not to be used during a cutting operation. In such operation, the operator, in order to select a channel for a pair of limit switches only has to close the two selector switches for a desired channel of operation of the back gauge. Of course, the above channel control means may also be incorporated readily in other types of programmed systems of control for the cutting machine if desired, by those skilled in the art.

In the preferred form of FIGURES 1, 2 and 3 the reduction of gearing between member 20 and member 38 is such that for the entire travel of the back gauge, drum member 40 uniquely makes less than one revolution as already described. With the addition of more limit switches this modification may be used to switch from channel to channel in automatic spacer control devices where an indexing scheme for each channel is used similar to that illustrated and described in FIGURES 4, 5, and 6.

Figure 5:
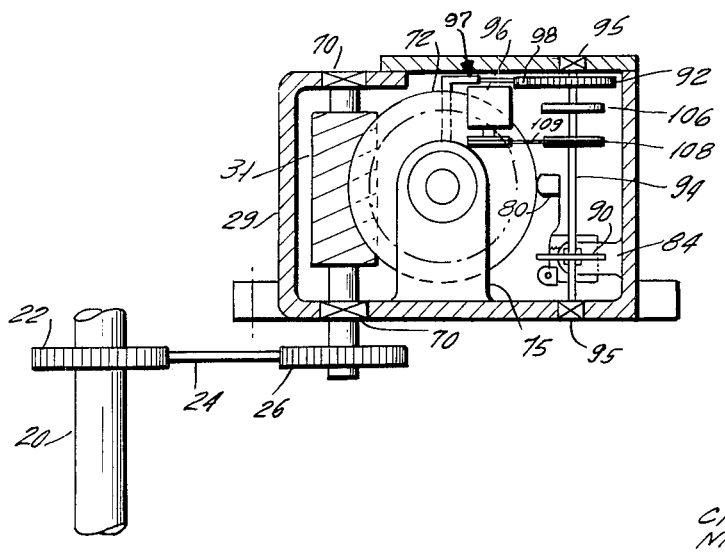
FIGURE 5 is a sectional view in plan of FIGURE 4 taken on lines 5—5 looking in the direction of the arrows.

FIGURES 4, 5 and 6 illustrate another exemplary embodiment of the invention in which like reference numerals designate like parts or circuitry. In this modification the same principle of gearing linkage to the lead screw drive member of the back gauge is used as that used in FIGURES 1, 2 and 3. The limit switch actuator means 57 of FIGURE 1 has been replaced with drum member 72 of FIGURE 4, which is adapted to carry a magnetic tape 76 which cooperates with tape head 78 and 80 through control circuitry and indexing means as illustrated in FIGURES 4, 5 and 6.

Referring to FIGURES 4 and 5, the back gauge travel adjustment is driven by sprocket 22 secured to the driven lead screw 20 of the back gauge. Sprocket means 22 drives by belt means 24 sprocket means 26 secured on worm means 21 supported in bearing means 70. Worm means 31 drives worm gear means 39 on shaft means 73 supported in bearing means 74 in housing 29 and support means 75. The variable back gauge travel adjustment control means consists of a recorded magnetic tape means 76 fastened to drum means 72 secured to shaft means 73 as shown. Tape means 76 carries a plurality of programmed and recorded channel space travel limitations in the form of signals for each desired travel of the back gauge for a particular type of job order for trimmed paper stock. As an illustration, a magnetic tape of 2 inch width or other desired width may be used on drum 72 containing a plurality of recorded channels of signals to be used by tape heads 78 and 80. Drum 72 makes less than one full revolution for the full travel of the back gauge. Thus, there is a dead space provided for fastening the ends of tape 76 to drum 72 by any desired securing means. Coacting with tape 76 are tape heads 78 and 80 to pick up, record and erase the front and rear limits of the back gauge motion for each channel of operation as will be explained in more detail in connection with the operation of the circuitry of FIGURE 6. Tape heads 78 and 80 are sprung on carriage 86 which is mounted on square shaft 82 mounted in bearings means 85 in support means 84. One end of shaft means 82 carries roller means 88 which coacts with dwell areas on cam 90 to position tape heads 78 and 80 for operation in each respective channel on tape 76 as shown in FIGURE 4 for the various channels for selective distance of travel of the back gauge. The dwell areas on cam 90 each represent a relative channel position for tape heads 78 and 80 on tape 76. The dwell areas on cam 90 are interconnected by rising contours as shown in FIGURE 4. Tape head 78 serves as the front travel limit of the back gauge while tape head 80 serves as the back travel limit of the back gauge for a channel. An index means 97 is provided. The dwell areas of cam 90 are indexed by detent wheel 92 coacting with roller device 98 carried by lever means 100 pivoted at 104 bearing means and biased against detent wheel 92 by spring means 99. Detent wheel 92 is fixedly mounted on shaft 94 which is supported in bearings 95. Channel selector switch means 106 is fixedly mounted on shaft 94 so as to be synchronized with index means 92 as shown in FIGURE 5. Rotary switch and sprocket means 108 is rotatably positioned on shaft 94 as shown. Rotary switch 108 is driven by belt means 109 by motor 96 in response to circuit responses of relay contact means 126 of FIGURE 6, actuated by relay coil 125 to sense and select the desired contact on rotary switch means 108 which is in series with a closed selector contact of switch 106 synchronized by shaft 94 and index means 97 for a respective channel on tape 76. In FIGURES 4 and 5, for purposes of clarity, the wiring to tape heads 78 and 80, motor 96, channel selector switch means 106, and rotary switch 108 has been omitted. This wiring is shown as part of the schematic circuit diagram of FIGURE 6.

The main circuit of FIGURE 6 is energized by leads 300 and 301 being connected to a 115 volt power line current source (not shown) or other desired source of electrical energy. This circuit in general, comprises channel selector switches with their respective rotary switches for each channel being connected in parallel with channel sensing motor 96, amplifier 114 and amplifier 116 connected across leads 300 and 301 by their secondary leads as shown in FIGURE 6.

Lead 171 may be connected to a condenser (not shown) charged by a battery or other source of direct current for the purpose of producing marking pulses for placing a mark signal on tape head 78 to be recorded on magnetic tape 76 for the forward limit of travel of the back gauge for a channel by the operation of manual switch 128. Likewise such condenser may be used to place a mark signal on tape head 80 to be recorded on magnetic tape 76 by the closing of switch 140. It will, of course, be understood that any known source of marking pulses may be used for these purposes.

Lead 166 is connected to a desired source of direct current (not shown) as a means of erasing signals on tape 76. To erase the forward signal for a channel of travel of the back gauge, manual switch 130 is closed to energize tape head coil 78. Similarly, to erase the rear limit signal on tape 76 for a channel of travel of the back gauge, manual switch 142 is closed energizing tape head coil 80 in contact with tape 76 to erase a recorded back signal.

Amplifier 114 serves as an amplification means for common signals from tape head 78 during forward travel of the back gauge. Amplifier 114 is energized by leads to points 180 and 184 of the circuit of FIGURE 6. Tape head 78 is connected to point 185 of the circuit and by lead 216 to amplifier 114. The signal output of tape head 78 is amplified in amplifier 114 and connected by lead 214 to relay coil means 123 whose energy closes its contact means 124 for the forward travel limit of the back gauge. Relay contact means 118 is in series with relay coil 123 connected to point 182 of the energized circuit. Relay contact means 118 may be used in a supplementary control circuit (not shown) to perform other functions or deenergize coil means 123 when its mission has been performed during forward travel of the back gauge.

Amplifier 116 serves as an amplification means for a channel command signal from tape head 80 and tape 76 during back travel of the back gauge. Amplifier 116 is energized by leads to points 178 and 190 of the circuit of FIGURE 6. Tape head coil 80 is connected to point 188 of the circuit and by lead 212 to amplifier 116. The control signal output from tape head 80 is amplified and connected by lead 210 in parallel to relay contact means 122 and to its corresponding actuating coil 121 which is connected in series to relay contact means 120 in a manner well known to those skilled in relay art of FIGURE 6. Relay contact means 120 may be used in a supplementary control circuit (not shown) to deenergize relay coil 121 when its mission has been performed during back travel of the back gauge.

In the relay circuitry, it will be apparent to those skilled in that art, that when relay coil means 125 is not energized by one of the channel circuits being closed, relay contact means 126 is normally closed. If relay coil means 123 is not energized by a channel signal output of amplifier 114, relay contact means 124 and 118 are normally open. Likewise, when relay coil means 121 is not energized by a signal output from amplifier 116, relay contact means 122 remains open.

FIGURE 6 shows circuitry for eight channels connected in parallel to leads 162 and 174. Each of these channels selectively represents a programmed distance of travel for the back gauge on magnetic tape 76. Channel selector switches 144, 146, 148, 150, 152, 154, 156 and 158 are a part of the index mechanism 92 and 106 which may be in the form of a commercial rotary switch having 8 contacts, 8 individual micro-switches or other form as desired. Rotary switches 145, 147, 149, 151, 153, 155, 157 and 159 for the eight channels may be represented as point contacts in a rotary switch and a sprocket means 108 which is selectively operated by motor 96 to close the circuit in which one of channel selector switches has been closed by the indexing mechanism 92. As a safety feature only one channel may be operated at a time by the index means 92. While eight channels of operation of the back gauge has been shown it is to be understood that this invention is not limited thereby, but may have any reasonable number of channels of operation, as desired.

For preparatory operation of the invention, various sequences of operation may be chosen, for example, the back gauge is placed at the furthest front position of travel as desired and mark switch 128 is closed temporarily. This discharges a condenser (not shown) to cause tape head 78 to place a magnetic mark on tape 76. Similarly, for the rear limit the back gauge is moved to the rear where the stop is desired and rear mark switch 140 is operated to cause tape head 80 to place a magnetic mark on tape 76. If these marks are to be changed before the cutting operation of the machine they may be erased from tape 76 by applying a continuous voltage to the required spot on tape 76 through erase switches 130 and 142 in the standard way. For each desired channel of operation the above steps of operation are repeated to record the required signals on each channel of tape 76, which is synchronized to its respective channel of indexing switch mechanism 92. When magnetic tape 76 is completely programmed for a paper cutting job it is ready for use. Use of magnetic tape 76 in this embodiment of the invention is unique in that it may be reused for long periods of time without renewal when once programmed for the channels. Tape 76 may be stored in a small storage space, is economical in cost, and may be erased and reprogrammed for use as desired.

The steps in operation of this embodiment of the invention as shown in FIGURE 6 may be generally described as follows:

A programmed recorded magnetic tape 76 is secured in place on drum 72, then index means 92 is indexed to a selected channel of operation after which means is actuated to energize lead screw 20 to start the back gauge to operate in limits of travel for a particular channel. During forward travel of the back gauge amplifier 114 is energized by tape 76, which causes amplifier 114 to energize relay coil 123 which closes contact means 124. In addition contact means 118, belonging to other portions of the circuit, is in series with relay coil means 123 to deenergize relay means 123 when once its mission has been accomplished for one cycle of operation for a channel. Similarly, for the rearward movement portion of the operating cycle of the back gauge for a channel, amplifier 116 is energized by tape 76 through tape head means 80. Then amplifier 116 energizes by lead 210 relay coil means 121 which closes relay contact means 122 for back travel of the back gauge. In addition relay contact means 120 which belongs to another portion of the circuit is in series with relay coil means 121 which deenergizes relay coil means 121 when its mission is accomplished. The above steps of operation may be repeated as desired for a particular channel. After tape 76 is programmed magnetically as above described for each channel of operation and fastened to drum 72, or set into this embodiment of the invention, the operator at the front of the cutting machine, may selectively proceed from one channel of operation to another channel of operation by merely changing index means 92 to the desired channel.

The relationship of the components for overall control of the machine utilizing the type of limit switch arrangement shown in FIGURE 1 is illustrated in FIGURE 8 by way of a block diagram. Persons skilled in the art will readily understand how to arrange any conventional circuitry in order to connect the forward limit switches and the reverse limit switches, designated as such on FIGURE 7, in order to achieve the effect and purpose of the invention. FIGURE 8 is a block diagram showing the arrangement for the limit switch mechanism described in conjunction with FIGURE 4, being very similar to the diagram of FIGURE 7 except for the insertion of a block representing the channel selector system of FIGURE 6. Persons skilled in the art will readily perceive how to apply the invention into any conventional control circuitry for guillotine paper cutters.

FIGURE 9 shows the housing means 28 at the front of the machine in a convenient position for adjustment of the limit switches and it will be understood that the primary purpose of the invention is readily served by such arrangement in order to preclude any need for an operator to go to the rear of the machine or to get into the machine itself for effecting predetermined stop positions of the back gauge.

While there has been described what is at present considered to be the preferred embodiments of this invention, it will be obvious to those skilled in the art that various changes and modifications may be made therein without departing from the spirit and scope of the invention.

It is to be understood, therefore, that the patent is not to be limited to the embodiments of the invention described herein, or in any manner other than by the scope of the appended claims.

The embodiments of the invention in which an exclusive privilege or property is claimed are defined as follows:

1. A programmed back gauge travel adjustment means in combination with a guillotine type cutting machine comprising an energized lead screw of a back gauge, a gear reduction means, a mechanical linkage driving means operably connecting said gear reduction means to said lead screw, drum means containing stored program means for forward and backward limit travels of the back gauge, operational index means contiguous to front of the machine for selectively choosing each corresponding forward and backward limit of travel of the back gauge, mechanical driving linkage means interconnecting said drum means with said gear reduction means, control circuit means interconnecting operation of said lead screw with said program means and relay means for selectively operating said control circuit in synchronism with said program means for selective operation of said back gauge in association with the conventional safety forward and backward travel limits of the back gauge.

2. A programmed back gauge travel adjustment means in combination with a guillotine type of cutting machine comprising a back gauge energized by a lead screw means, gear reduction means cooperating with said lead screw means, drum means containing a plurality of programmed contact actuator means, index means contiguous to the front of the machine to selectively operate the readout of said drum programmed means for each programmed travel of the back gauge, a plurality of limit travel contact means and relay means operably connected to said programmed contact means to cooperate with said lead screw means, and circuit means interconnecting said relay, programmed contact actuator means cooperating with said index means to operate said lead screw means in synchronism with each programmed path of travel of said back gauge during operation of the back gauge for various lengths of forward and backward path of travel of the back gauge within the conventional safety travel limits of the back gauge of the machine.

3. A programmed back gauge travel adjustment means in combination with a guillotine type of cutting machine comprising a back gauge, an energized lead screw means to actuate the travel of said back gauge, gear reduction means driven by said lead screw means, drum means driven by said gear reduction means, programmed multiple contact actuator means carried by said drum means in which two of said contact means provide the forward and backward limits for one path of travel of the back gauge within the standard safety limits of travel of the back gauge, a plurality of corresponding contact readout means interconnected to said programmed contact means, responsively relay means selectively actuated by said readout means, and control circuit means interconnecting said relay means, programmed means and lead screw means to selectively operate the back gauge for limits of travel to obtain a plurality of programmed distances between the cutting blade and the back gauge of the machine.

4. A programmed back gauge variable travel adjustment means in combination with a guillotine type of cutting machine comprising a back gauge, an energized lead screw means to actuate the travel of said back gauge, gear reduction means driven by said lead screw means, drum means driven by said gear reduction means, programmed magnetic tape means consisting of a plurality of recorded channels corresponding to the various lengths of travel of the back gauge secured to the circumference of said drum means, readout and recording dual tape head means selectively cooperating with said tape means, channel selector index means contiguous to the front of the machine for positioning said tape head means on said tape means, rotary channel selector switch means connected to said index means, rotatary channel sensing means connected in series with said channel switch means, sensing motor means connected to said rotary sensing switch means, mark and erasing circuit means for each direction of travel of back gauge interconnected to said tape head means, plural amplifier means connected to the program readout means of said tape head means including actuated plural relay means, and control circuit means cooperatively interconnecting said sensing motor, said relay means and said program readout means for the forward and backward limits of travel of said back gauge within existing corresponding conventional safety travel limits of the back gauge during use of the machine.

5. A programmed back gauge travel adjustment means in combination with a guillotine type of cutting machine comprising a back gauge, an energized lead screw means to actuate the travel of said back gauge, gear reduction means driven by said lead screw means, drum means energized by said driven gear reduction means, programmed magnetic tape means of a length substantially less than the circumferential distance around said drum means, said tape means being secured to said drum means, dual tape head means including record and readout means, index means contiguous to the front of the machine interconnected by cam means to position by channels said tape head means on said tape means, rotary channel selecting switch means secured to said index means, energized erasing circuit means selectively connected to said dual tape head means, energized mark and recording circuit means selectively connected to said dual tape head means, dual amplifier means selectively energized by one said dual tape head means during readout of the programmed forward travel and backward travel paths of said back gauge during one selected programmed channel of the back gauge, plural relay means energized by the readout of said tape means through said amplifier means, control circuit means energized by said amplifier means, circuit means connected to said control circuit means to deenergize said relay means once the forward programmed limit of travel of the back gauge has been obtained, cooperating circuit means connected to said control circuit means to deenergized said relay means once the backward programmed limit of travel of the back gauge for a channel has been obtained, energized circuit means for completing one complete cycle of operation from said programmed tape for each channel of dual recorded travel limits of the back gauge during use.

6. A programmed back gauge travel adjustment as in claim 5 wherein said control circuit comprises a relay energized sensing motor to selectively operate a rotary switch in series with said channel selector switch to energize said back gauge within the travel limits for a programmed channel of operation.

7. A programmed back gauge travel adjustment means as in claim 6 wherein said control circuit comprises relay energized means to operate other desired functions as desired in a conventional operating circuit of a guillotine type cutting machine.

References Cited by the Examiner
UNITED STATES PATENTS

| | | | |
|---|---|---|---|
| 2,690,913 | 10/1954 | Rabinow | 274—10 |
| 2,733,425 | 1/1956 | Williams | 340—174 |
| 2,800,642 | 7/1957 | May | 340—174 |
| 2,821,252 | 1/1958 | Thumim | 214—1.6 |
| 2,842,985 | 7/1958 | Grover | 77—26 |
| 2,916,801 | 12/1959 | Lyttle | 214—1.6 |
| 2,992,578 | 7/1961 | Hribar | 83—71 |
| 3,118,334 | 1/1964 | Blaha. | |

HUGO O. SCHULZ, *Primary Examiner.*

MARVIN A. CHAMPION, *Examiner.*